(12) United States Patent
Tsujii (10) Patent No.: US 9,503,591 B2
(45) Date of Patent: Nov. 22, 2016

(54) IMAGE PROCESSING APPARATUS, MOBILE TERMINAL, SYSTEM, METHODS OF CONTROLLING THESE, AND STORAGE MEDIUM

(71) Applicant: CANON KABUSHIKI KAISHA, Tokyo (JP)

(72) Inventor: Hiroto Tsujii, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/535,385

(22) Filed: Nov. 7, 2014

(65) Prior Publication Data
US 2015/0156343 A1 Jun. 4, 2015

(30) Foreign Application Priority Data
Nov. 29, 2013 (JP) .................... 2013-248341

(51) Int. Cl.
*G06F 15/00* (2006.01)
*H04N 1/00* (2006.01)

(52) U.S. Cl.
CPC .... *H04N 1/00307* (2013.01); *H04N 2201/006* (2013.01); *H04N 2201/0075* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,219,669 B1* | 4/2001 | Haff et al. | |
| 8,042,163 B1* | 10/2011 | Karr | G06F 3/062 713/164 |
| 2006/0168000 A1* | 7/2006 | Bodlaender | G06F 17/30176 709/205 |
| 2008/0239387 A1 | 10/2008 | Otsuka | 358/1.15 |
| 2010/0110494 A1* | 5/2010 | Park et al. | 358/1.16 |
| 2010/0231949 A1* | 9/2010 | Mori | 358/1.14 |
| 2013/0229684 A1* | 9/2013 | Yasuzaki | 358/1.15 |
| 2013/0294430 A1* | 11/2013 | Kimura | 370/338 |
| 2014/0245413 A1* | 8/2014 | Yasui | 726/7 |

FOREIGN PATENT DOCUMENTS

JP 2008-250689 A 10/2008

* cited by examiner

*Primary Examiner* — Helen Q Zong
(74) *Attorney, Agent, or Firm* — Fitzpatrick, Cella, Harper & Scinto (57) ABSTRACT

A mobile terminal 102, when an MFP 101 is approached, transmits to the MFP 101, using a short-range wireless communication, a scan start instruction and access information. Furthermore, the mobile terminal 102, when job-related information related to a job is received, publicizes accessibly a storage area, and when the job corresponding to the job-related information completes, makes the publicized storage area to be unpublicized. On the other hand, the MFP 101 receives the scan start instruction and the access information, issues the job-related information, notifies, using the short-range wireless communication, the mobile terminal of the job-related information, and stores the image data read from the original in accordance with the start instruction by accessing the publicized storage area.

14 Claims, 8 Drawing Sheets

IMAGE PROCESSING APPARATUS, MOBILE TERMINAL, SYSTEM, METHODS OF CONTROLLING THESE, AND STORAGE MEDIUM

BACKGROUND OF THE INVENTION

1. Field of the Invention

The present invention relates to a system of an image processing apparatus such as a multi function peripheral, a printer, or the like, that uses short-range wireless communication with a short-range wireless communication device, and in particular, relates to a cooperating image processing apparatus, mobile terminal, system, methods of controlling these, and storage medium.

2. Description of the Related Art

In recent years, a technique referred to as NFC (Near Field Communication) for realizing short-range wireless communication has rapidly come to be widely used in smart phones, tablet PCs and mobile terminals. In a specification of NFC, three functions are defined. One is a reader/writer function by which it is possible to perform reading and writing of data for an NFC card and an NFC tag. A second is a peer-to-peer function by which it is possible to perform various data transmission and receiving via NFC. Both have characteristics of easiness and convenience whereby communication can be established with a gesture such as a user touching a device. Also, there are techniques for publicizing to a network a storage area of an information device using a WebDAV (Web-based Distributed Authoring and Versioning) protocol, an SMB (Server Message Block) protocol, or the like. In addition, in Japanese Patent Laid-Open No. 2008-250689, a technique for performing transmission and reception of print data between an MFP and an information device using these protocols is proposed. Also, there is a technique in which, applying the above described technique, a storage area of a mobile terminal is publicized, and scanned data is transmitted from an MFP, and a technique in which information (for example, an IP address) for accessing a storage area of a mobile terminal is received via NFC from the mobile terminal.

However, there are problems with the above described conventional techniques as recited below. For example, when saving scan data from the MFP to a storage area of the mobile terminal publicized using WebDAV, the SMB protocol, or the like, the mobile terminal continues to publicize the storage area because the mobile terminal does not know if the saving of the scan data has completed. For this reason, from a security perspective, this is not preferable for users. In addition, the user his/herself monitoring whether scan data is saved to the storage area of the mobile terminal, and then changing the storage area to be unpublicized, is cumbersome for the user, and inefficient.

SUMMARY OF THE INVENTION

The present invention enables realization of an arrangement in which, in a case where scan data from an image processing apparatus is saved, a storage area of a mobile terminal is publicized suitably.

One aspect of the present invention provides a system in which a mobile terminal and an image processing apparatus are capable of communicating, the system comprising: the mobile terminal, which comprises: a transmission unit configured to transmit to the image processing apparatus, using a short-range wireless communication, a start instruction for causing the image processing apparatus to start a read of an image and access information for accessing the mobile terminal; and a publicizing control unit configured to, when job-related information related to a job corresponding to the start instruction is received from the image processing apparatus in response to the start instruction, publicize accessibly a storage area of the mobile terminal designated by the access information, and when the job corresponding to the job-related information completes, make the publicized storage area to be unpublicized, and the image processing apparatus, which comprises: a job-related information notification unit configured to receive the start instruction and the access information transmitted by the transmission unit, to issue the job-related information, and to notify, using the short-range wireless communication, the mobile terminal of the job-related information; a reading unit configured to read an image from an original in accordance with the start instruction; and a storage unit configured to store image data read from the original by the reading unit by accessing, using the access information, which is for accessing the storage area publicized by the publicizing control unit.

Another aspect of the present invention provides a mobile terminal capable of communicating with an image processing apparatus, the mobile terminal comprising: a transmission unit configured to transmit to the image processing apparatus, using a short-range wireless communication, a start instruction for causing the image processing apparatus to start a read of an image and access information for accessing the mobile terminal; and a publicizing control unit configured to, when job-related information related to a job corresponding to the start instruction is received from the image processing apparatus in response to the start instruction, publicize accessibly a storage area of the mobile terminal designated by the access information, and when the job corresponding to the job-related information completes, make the publicized storage area to be unpublicized.

Still another aspect of the present invention provides an image processing apparatus capable of communicating with a mobile terminal, the image processing apparatus comprising: a job-related information notification unit configured to receive, using a short-range wireless communication, a start instruction, for casing the image processing apparatus to start a read of an image, and access information, for accessing the mobile terminal, which are transmitted from the mobile terminal, to issue job-related information relating to a job corresponding to the start instruction, and to notify, using the short-range wireless communication, the mobile terminal of the job-related information; a reading unit configured to read an image from an original in accordance with the start instruction; and a storage unit configured to store image data read from the original by the reading unit by accessing, using the access information, which is for accessing a storage area publicized by the notification of the job-related information by the job-related information notification unit.

Yet still another aspect of the present invention provides a method of controlling a system in which a mobile terminal and an image processing apparatus are capable of communicating, wherein the mobile terminal transmits to the image processing apparatus, using a short-range wireless communication, a start instruction for causing the image processing apparatus to start a read of an image and access information for accessing the mobile terminal; when job-related information related to a job corresponding to the start instruction is received from the image processing apparatus in response to the start instruction, publicizes accessibly a storage area of the mobile terminal designated by the access information;

and when the job corresponding to the job-related information completes, makes the publicized storage area to be unpublicized, and wherein the image processing apparatus receives the start instruction and the access information transmitted in the transmitting by the mobile terminal, issues the job-related information, and notifies, using the short-range wireless communication, the mobile terminal of the job-related information; reads an image from an original in accordance with the start instruction; and stores, image data read from the original in the reading by the image processing apparatus by accessing, using the access information, which is for accessing the storage area publicized in the publicizing by the mobile terminal.

Still yet another aspect of the present invention provides a method of controlling a mobile terminal capable of communicating with an image processing apparatus, the method comprising: transmitting to the image processing apparatus, using a short-range wireless communication, a start instruction for causing the image processing apparatus to start a read of an image and access information for accessing the mobile terminal; and when job-related information related to a job corresponding to the start instruction is received from the image processing apparatus in response to the start instruction, publicizing accessibly a storage area of the mobile terminal designated by the access information, and when the job corresponding to the job-related information completes, making the publicized storage area unpublicized.

Yet still another aspect of the present invention provides a method of controlling an image processing apparatus capable of communicating with a mobile terminal, the method comprising: receiving, using a short-range wireless communication, a start instruction, for causing the image processing apparatus to start a read of an image, and access information, for accessing the mobile terminal, which are transmitted from the mobile terminal, issuing job-related information relating to a job corresponding to the start instruction, and notifying, using the short-range wireless communication, the mobile terminal of the job-related information; reading an image from an original in accordance with the start instruction; and storing image data read from the original in the reading by accessing, using the access information, which is for accessing a storage area publicized by the notification of the job-related information in the notifying.

Still yet another aspect of the present invention provides a non-transitory computer-readable storage medium storing a computer program for causing a computer to execute each step of the method of controlling the mobile terminal.

Yet still another aspect of the present invention provides a non-transitory computer-readable storage medium storing a computer program for causing a computer to execute each step of the method of controlling the image processing apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

System Configuration

Below, explanation will be given for a first embodiment of the present invention. Firstly, explanation will be given for an overview of a mobile SEND system according to embodiments of the present invention with reference to FIG. 1. A mobile SEND system 100 is comprised of an MFP 101, a mobile terminal 102, an access point 103, and personal computers (information processing apparatuses) 107 and 110. Each apparatus is connected so that it is possible to transmit and receive information to each other via a wireless LAN (local area network) 104 and a network 105. Note that the embodiments are not intended to limit the number or the kind of apparatuses in a system shown in FIG. 1, and that it is possible to apply the present invention to a system of other embodiments. For example, the mobile SEND system 100 can be configured to include a FAX (facsimile) apparatus 109 shown in FIG. 3 in addition to the apparatuses shown in FIG. 1.

Figure 1:
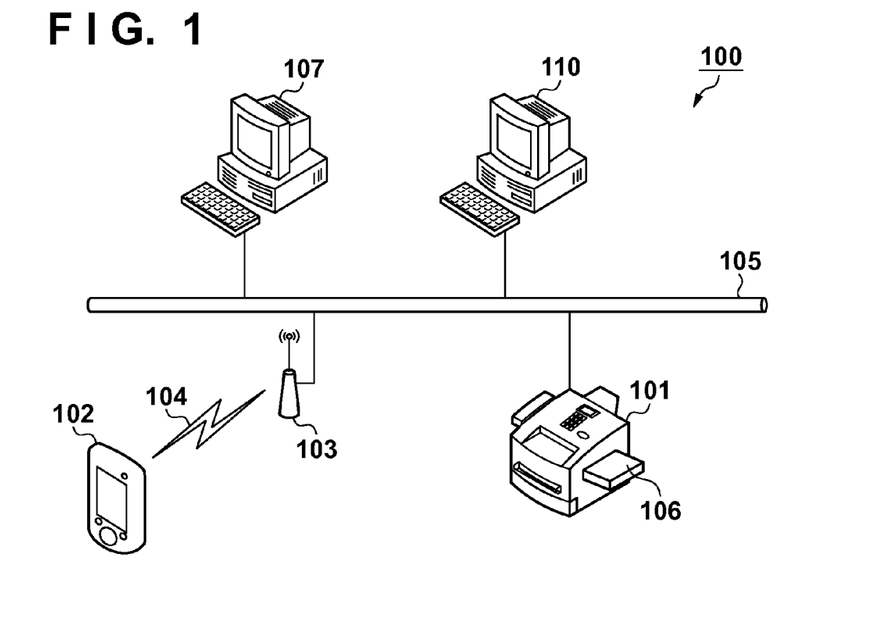
FIG. 1 is a view for showing a system configuration showing an overview of a mobile SEND system according to a first embodiment.

The MFP (multi-function peripheral) 101 comprises a network interface, and is connected to the personal computer (hereinafter abbreviated to PC) 107 or the access point 103 via the network 105. Also, an NFC tag 106 is mounted on the MFP 101, and configuration is taken such that it is possible to communicate with an NFC mounted device. NFC (Near Field Communication) represents a short-range wireless communication. The MFP 101 also has an I/F to a telephone public circuit network 108, and configuration is taken such that FAX transmission and reception with the FAX apparatus 109 connected via the telephone public circuit network 108 are possible. Note that the MFP 101 is one example of an image processing apparatus.

The mobile terminal 102 comprises a wireless LAN I/F, and is connected to the access point 103 via the wireless LAN 104. Here, description is given with the presumption that an IEEE 802.11 standard is supported. In this embodiment, configuration is taken such that the MFP 101 and the mobile terminal 102 communicate and cooperate via the wireless LAN 104 and the network 105 as shown in FIG. 1. The PCs 107 and 110 can perform communication with the MFP 101 or the mobile terminal 102 via the network 105, and for example, are able to cause the MFP 101 to print by inputting image data.

<Other System Configuration>

Figure 2:
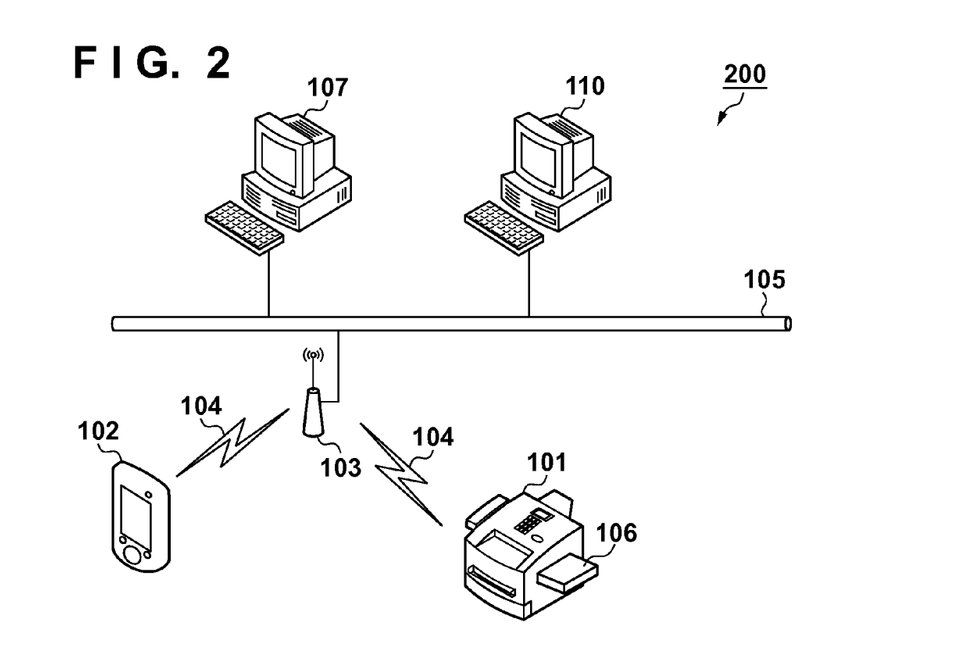
FIG. 2 is a view for showing a system configuration showing an overview of a mobile SEND system according to other embodiments.

Next, explanation will be given for an example configuration of a mobile SEND system 200 according to other embodiments of the present invention with reference to FIG. 2. Note that here, an explanation of portions different from the mobile SEND system 100 in FIG. 1 is described. The MFP 101 comprises the wireless LAN I/F, and is connected to the access point 103 via the wireless LAN 104, not via the network 105. Therefore, unlike FIG. 1, configuration is taken such that the MFP 101 and the mobile terminal 102 communicate and cooperate via only the wireless LAN 104.

<Image Processing Apparatus Configuration>

Figure 3:
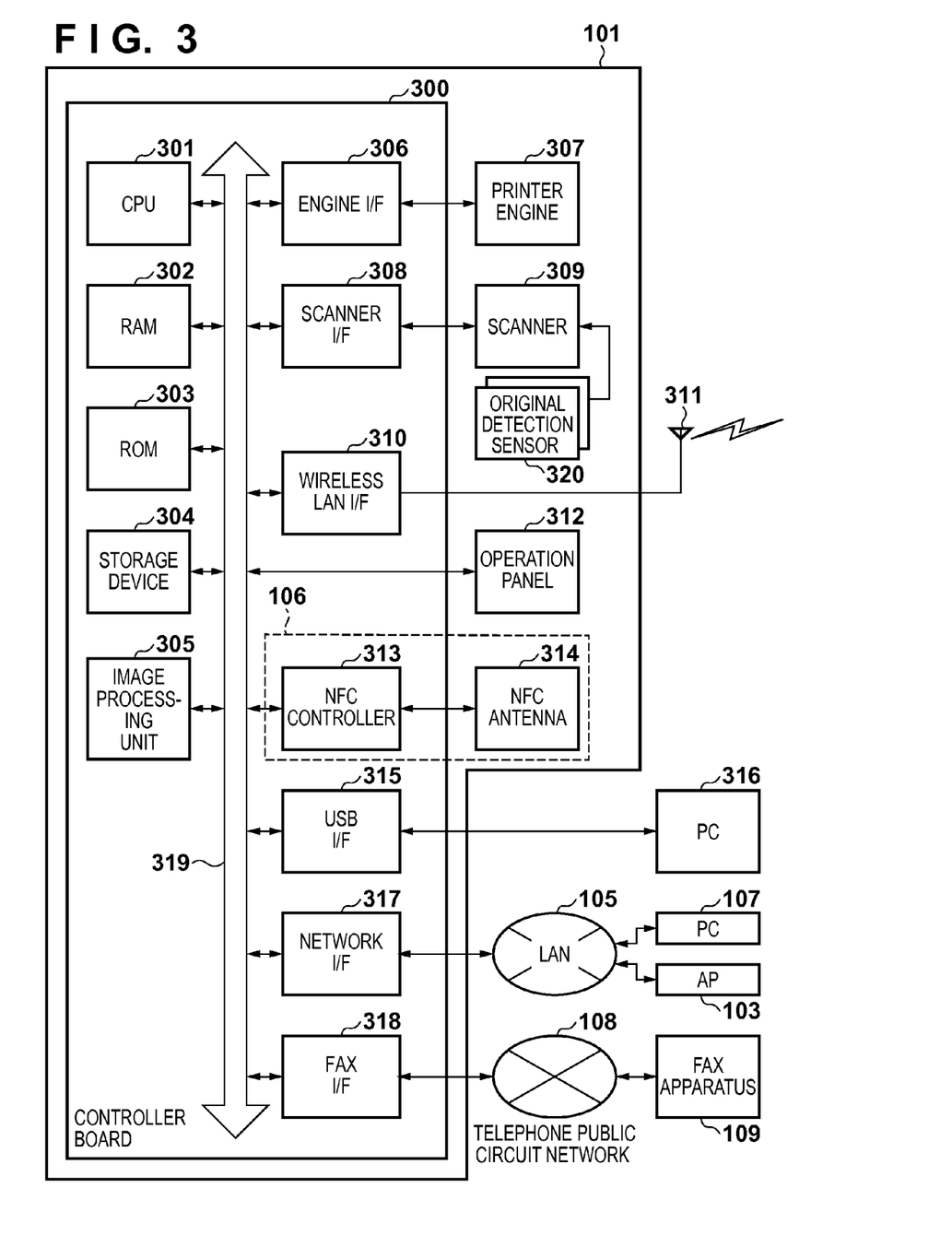
FIG. 3 is a view for showing a hardware configuration of an MFP according to the first embodiment.

Next, explanation will be given for a hardware configuration of the MFP 101 included in the mobile SEND system 100 shown in FIG. 1 with reference to FIG. 3. The MFP 101 is provided with a controller board 300, a scanner 309, a printer engine 307, an operation panel 312 and an NFC antenna 314. Each unit cooperates with the others, and functions such as printing, scanning, copying, FAX, or the like, are realized.

The scanner 309 scans an original and outputs image (print) data. The printer engine 307 performs printing on a sheet in accordance with the print data. The operation panel 312 handles displaying various setting operations, an alarm, or the like. An original detection sensor 320 for performing a detection of an original is connected to the scanner. A pressing plate unit (an original platen scanner unit) and an ADF unit (Auto Document Feeder unit) are both equipped with the original detection sensor 320. In a case of the pressing plate unit, if an original is placed on an original platen glass, it is detected that the original is placed, and the scanner 309 is notified to that effect. In a case of the ADF unit, if an original is placed on a feeder, it is detected that the original is placed, and the scanner 309 is notified to that effect.

The controller board 300 is equipped with a CPU 301, a RAM 302, a ROM 303, a storage device 304, an image processing unit 305, an engine I/F (interface) 306, a scanner I/F 308, a wireless LAN I/F 310, an NFC controller 313, a USB I/F 315, a network interface 317, and a FAX I/F 318. The CPU 301 is a controller controlling all of the MFP 101, and is connected to each unit via a system bus 319. Configuration is taken such that communication with an external unit is possible via the external I/Fs. The FAX I/F 318 is connected to the telephone public circuit network 108 via a plug-in phone jack, and performs FAX transmission and reception with the FAX apparatus 109.

The network interface 317 is connected to the network 105 via a LAN I/F connector, and performs network communication with the PCs 107 and 110. The access point 103 is also connected to the network 105, and performs network communication with the mobile terminal 102 via the wireless LAN 104. The USB I/F 315 to a PC 316 makes a local connection with the PC 316 via an USB connector, and performs USB communication. The wireless LAN I/F 310 is connected to the access point 103 by a wireless LAN via a wireless LAN antenna 311, and performs wireless LAN communication. The NFC controller 313 performs a short-range wireless communication (NFC) with a mobile terminal equipped with NFC via the NFC antenna 314.

Regarding communication between the controller board 300 and other units inside of the MFP 101, configuration is taken such that communication is possible via respective internal I/F. Data communication with the scanner 309 is performed via the scanner I/F 308. Data communication with the printer engine 307 is performed via the engine I/F 306. Data communication with the operation panel 312 is performed via the system bus 319.

The ROM 303 is a boot ROM in which a boot program of the MFP 101 is stored. The RAM 302 is a system work memory for operation of the CPU 301 in which computation data of the CPU 301 or various programs are stored. Also, the RAM 302 is used for an image memory maintaining image data to which various image processing is applied in the image processing unit 305 during printing, or the like. The storage device 304 is non-volatile secondary storage device for saving large-size programs or data, and saved large-size programs or data are used by loading them into the RAM 302.

<Configuration of Mobile Terminal>

Figure 4:
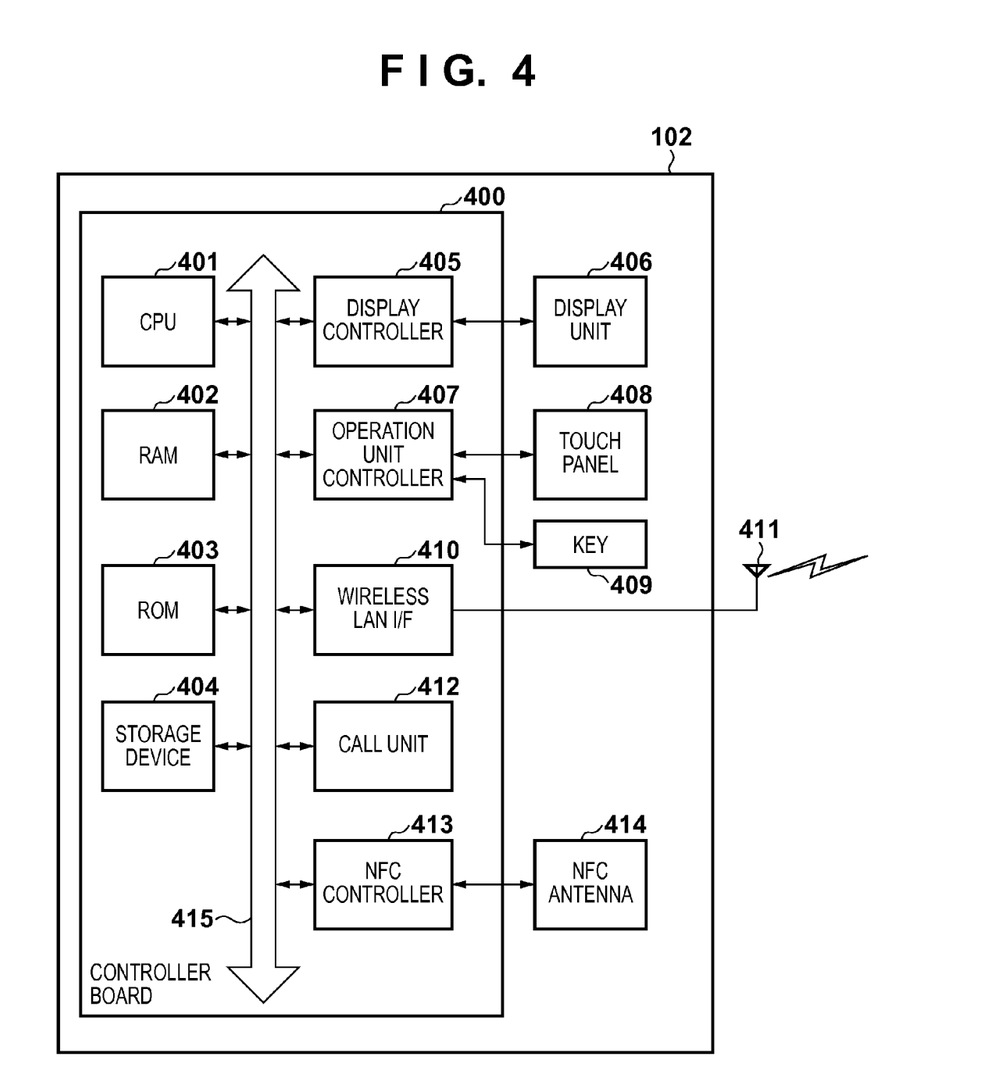
FIG. 4 is a view for showing a hardware configuration of a mobile terminal according to the first embodiment.

Next, explanation will be given for the hardware configuration of the mobile terminal included in the mobile SEND system 100 shown in FIG. 1 with reference to FIG. 4. The mobile terminal 102 is equipped with a controller board 400, a display unit 406, a touch panel 408, a key 409, and an NFC antenna 414. Each unit cooperates respectively, and a function of the mobile terminal 102 is realized. The display unit 406 performs various displaying in accordance with control of a display controller 405. The touch panel 408 and the key 409 perform various operations in accordance with a control of an operation unit controller 407, and configuration is taken such that each unit cooperates and can be operated.

The controller board 400 is equipped with a CPU 401, a RAM 402, a ROM 403, a storage apparatus 404, the display controller 405, the operation unit controller 407, a wireless LAN I/F 410, a call unit 412, and an NFC controller 413. The CPU 401 is a controller controlling the mobile terminal on the whole, and is connected to each unit via a system bus 415. The wireless LAN I/F 410 is connected to the access point 103 with a wireless LAN via the wireless LAN antenna 411, and performs wireless LAN communication with an external unit. The call unit 412 is connected to a microphone or a speaker (not shown), and is connected to a public switched telephone network, and operates as a telephone. The NFC controller 413 performs a short-range wireless communication (NFC) with a device equipped with NFC via an NFC antenna 414.

The ROM 403 is a boot ROM in which a boot program of the mobile terminal 102 is stored. The RAM 402 is a system work memory for operation of the CPU 401 in which computation data of the CPU 401 or various programs are stored. The storage device 404 is non-volatile secondary storage device for saving large-size programs or data, and saved large-size programs or data are used by loading them into the RAM 402.

<MFP Cooperation Application>

Next, explanation will be given for an operation and screens of MFP cooperation applications (referred to as mobile SEND and mobile FAX in this embodiment) operating on the mobile terminal 102, with reference to FIG. 5. As mentioned previously, the mobile terminal 102 according to the embodiment is equipped with the display unit 406 and the touch panel 408. A user can give an instruction, such as one to scroll a menu or one to press a button, to the menu or the button displayed on the display unit 406 by sliding or touching a finger on the touch panel 408. An input using a touch panel is assumed in the screens explained below. Note that it is not necessary to limit to this kind of the input format in the present invention, and that it is also possible to apply another input format.

Figure 5:
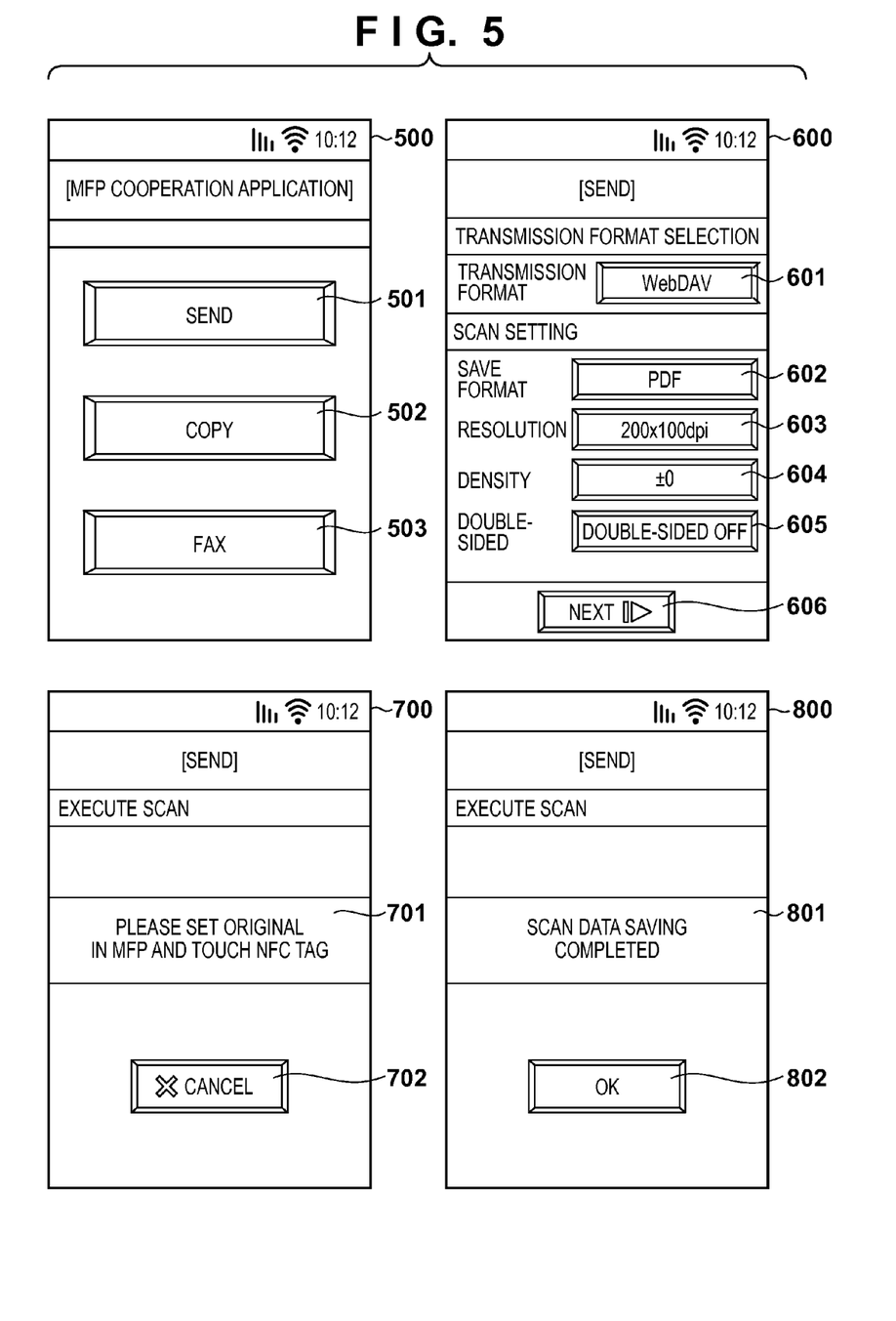
FIG. 5 is a view for showing a screen of an MFP cooperation application of the mobile terminal according to the first embodiment.

FIG. 5 shows top screens of an MFP cooperation application. In the present embodiment, explanation will be given for a mobile SEND application where the mobile terminal 102 and the MFP 101 perform SEND in a cooperative manner. A SEND button 501, a COPY button 502, and a FAX button 503 are included in a top screen 500. When the SEND button 501 is pressed, a setting screen 600 of the mobile SEND application is displayed. Configuration is taken such that settable items such as a transmission format are displayed, and each item can be set by an operation of the touch panel. Also, configuration is taken such that items for various modes settable upon SEND can be set by an operation the touch panel.

A candidate for the setting for the transmission format is displayed on a transmission format setting button 601, and in a case where a user wishes to change the setting, the user can select from out of other candidates included in a screen that the user can switch to by pressing the button. If it is not changed, the setting is set to WebDAV which is displayed on the transmission format setting button 601. If it is changed, the changed setting is displayed on the transmission format setting button 601. A candidate for the setting for the save format is displayed on a save format setting button 602, and in a case where a user wishes to change the setting, the user can select from out of other candidates included in a screen that the user can switch to by pressing the button. If it is not changed, the setting is set to pdf which is displayed on the save format setting button 602. If it is changed, the changed setting is displayed on the save format setting button 602. The setting value of a resolution setting button 603, a density setting button 604, and a double-sided print setting button 605 also can be changed by similar operation on the transmission format setting button 601 or the save format setting button 602.

By pressing a next button 606 on the setting screen 600, each item is set and the screen is switched to a screen 700. The screen 700 is comprised of a message display 701 for proceeding to subsequent processing and a cancel button 702 for suspending processing. The screen is switched to a screen 800 after completing the SEND processing on the MFP 101 side. The screen 800 is comprised of a message display 801 to convey to a user that the SEND has completed and an OK button 802 to cause the processing to complete.

<SEND Processing>

Figure 6:
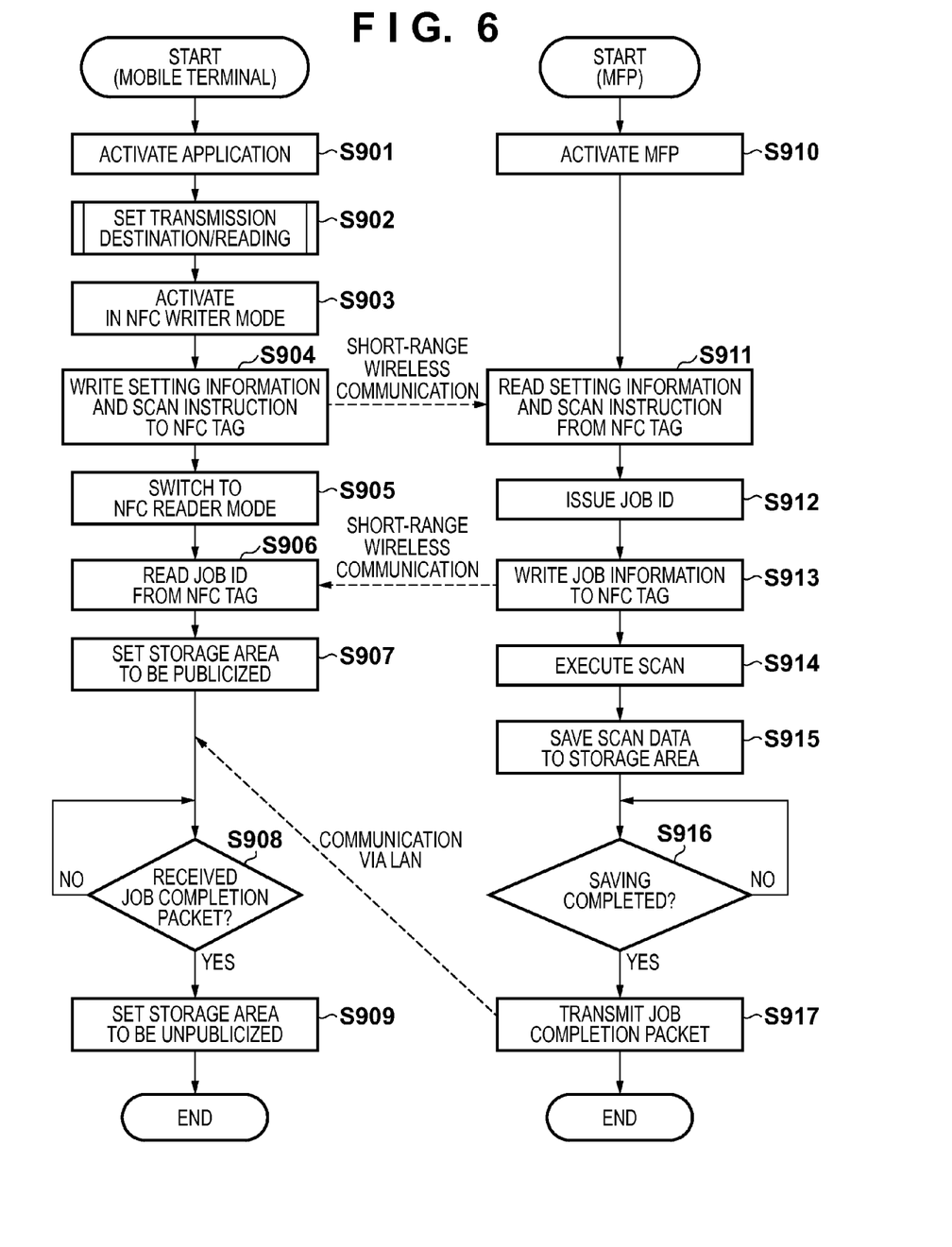
FIG. 6 is a view for showing an overall flow of a SEND operation according to the first embodiment.

Next, using a flowchart in FIG. 6, explanation will be given for a processing procedure of SEND realized by the MFP 101 and the mobile terminal 102 in a cooperative manner. Step S901 through step S909, which are processing of the mobile terminal 102, in the flowchart, are based on a program stored on either the ROM 403, the storage apparatus 404, or the RAM 402 in FIG. 4, and are executed by the CPU 401. Also, step S910 through step S917, which are processing of the MFP 101, in the flowchart, are based on the program stored on either the ROM 303, the storage device 304, and the RAM 302 in FIG. 3, and are executed by the CPU 301.

Firstly as mentioned previously, when the main power is activated, based on the program stored on the ROM 303 on the controller board 300, the MFP 101 activates the CPU 301 in step S910. On the other hand, the mobile terminal 102 activates the mobile SEND application in order to perform the mobile SEND in step S901. After the activation, the mobile SEND application displays the previously described screen 600 on the display unit 406, and in accordance with a user input, settings of the transmission format, the save format, the original scan (read), or the like, are performed in step S902. When a user completes the setting of the transmission format, or the like, and the subroutine in step S902 is left.

The transmission of the setting information of SEND or the start instruction of the original scan is performed by writing to the NFC tag arranged on the MFP 101 by an NFC writer arranged on the mobile terminal 102 in the present embodiment. More specifically, the CPU 401 activates the NFC controller 413 of the mobile terminal 102 in a writer mode in step S903. After that, when the user causes the mobile terminal 102 to approach the NFC tag 106 of the MFP 101, the CPU 401 writes the setting information and a scan start instruction to the NFC tag 106 of the MFP 101, and writes access information for accessing the storage apparatus 404 of the mobile terminal 102 in step S904. Note that the above described access information is an IP address and a port number of the mobile terminal 102 in the present embodiment.

In a case where the setting information is received from the mobile terminal 102, the CPU 301 reads out the setting information, the scan instruction and the access information written to the NFC tag in step S911. Then, the CPU 301 functioning as a job-related information notification unit, responds to the scan instruction, issues SEND job related information (job ID) in step S912, and writes the job ID to the NFC tag 106 in step S913.

The reception of the job ID in the present embodiment is performed by reading out, by the NFC reader arranged on the mobile terminal 102, the information from the NFC tag 106 of the MFP 101. Therefore, the CPU 401 switches the NFC controller 413 of the mobile terminal 102 into a reader mode in step S905. Then, the CPU 401 reads out scan job related information (for example a job ID) from the NFC tag 106 of the MFP 101 in step S906. Note that the processing of step S904 through step S906 and step S911 through step S913 is executed if the mobile terminal 102 is approached to the NFC tag 106 of the MFP 101 by the user only one time.

Next, in step S907, the CPU 401 opens a port whose port number is included in the access information transmitted to the MFP 101 in step S904, and publicizes accessibly the storage area designated by the access information. With this, a state in which the MFP 101 can access the storage apparatus (storage area) 404 of the mobile terminal 102 is entered. On the other hand, with the original scan instruction received in step S911, the CPU 301 starts scanning the original in step S914. Then, when scanning is completed, the CPU 301 accesses the publicized storage apparatus 404 of the mobile terminal 102 via the network 105 in step S915, and saves the scan data on the storage apparatus 404. The CPU 301 determines whether or not the saving of the scan data is completed in step S916. When the saving is completed, the processing proceeds to step S917 and the CPU 301, functioning as a job completion notification unit, transmits to the mobile terminal 102 via the network 105 a job completion packet linked to the job ID, and the process is terminated. On the other hand, the CPU 401 determines whether or not the job completion packet is received from the MFP 101 in step S908. When the job completion packet is received, the processing proceeds to step S909, the CPU 401 closes the port, and the process is terminated.

As explained above, the mobile SEND systems 100 and 200 according to the embodiment comprise the mobile terminal 102 and the MFP 101 which are connected communicatively. The mobile terminal 102 transmits the scan start instruction and the access information to the MFP 101 using a short-range wireless communication when the mobile terminal 102 approaches to the MFP 101. Furthermore, when the mobile terminal 102 receives job-related information related to a job (for example, a job ID or a file name), the mobile terminal 102 publicizes accessibly a storage area, and when the job corresponding to the job-related information completes, the mobile terminal 102 makes the publicized storage area to be unpublicized. On the other hand, the MFP 101 receives the scan start instruction and the access information, issues the job-related information, sends notification to the mobile terminal using the short-range wireless communication, and stores the image data read from the original according to the start instruction by accessing the publicized storage area. In this way, according to the present embodiment, the mobile terminal 102 notifies the image processing apparatus, to which the job is input, of the access information for accessing the storage area of the mobile terminal 102 using the short-range wireless communication, and publicizes accessibly the above described storage area up until the job is executed and completed. According to the present embodiment, security of the storage area of the mobile terminal can be improved, and a user is able to execute processing cooperating with the MFP 101 with a simple operation which does not require the user to be conscious of whether or not the storage area is publicized or unpublicized.

Second Embodiment

Figure 7:
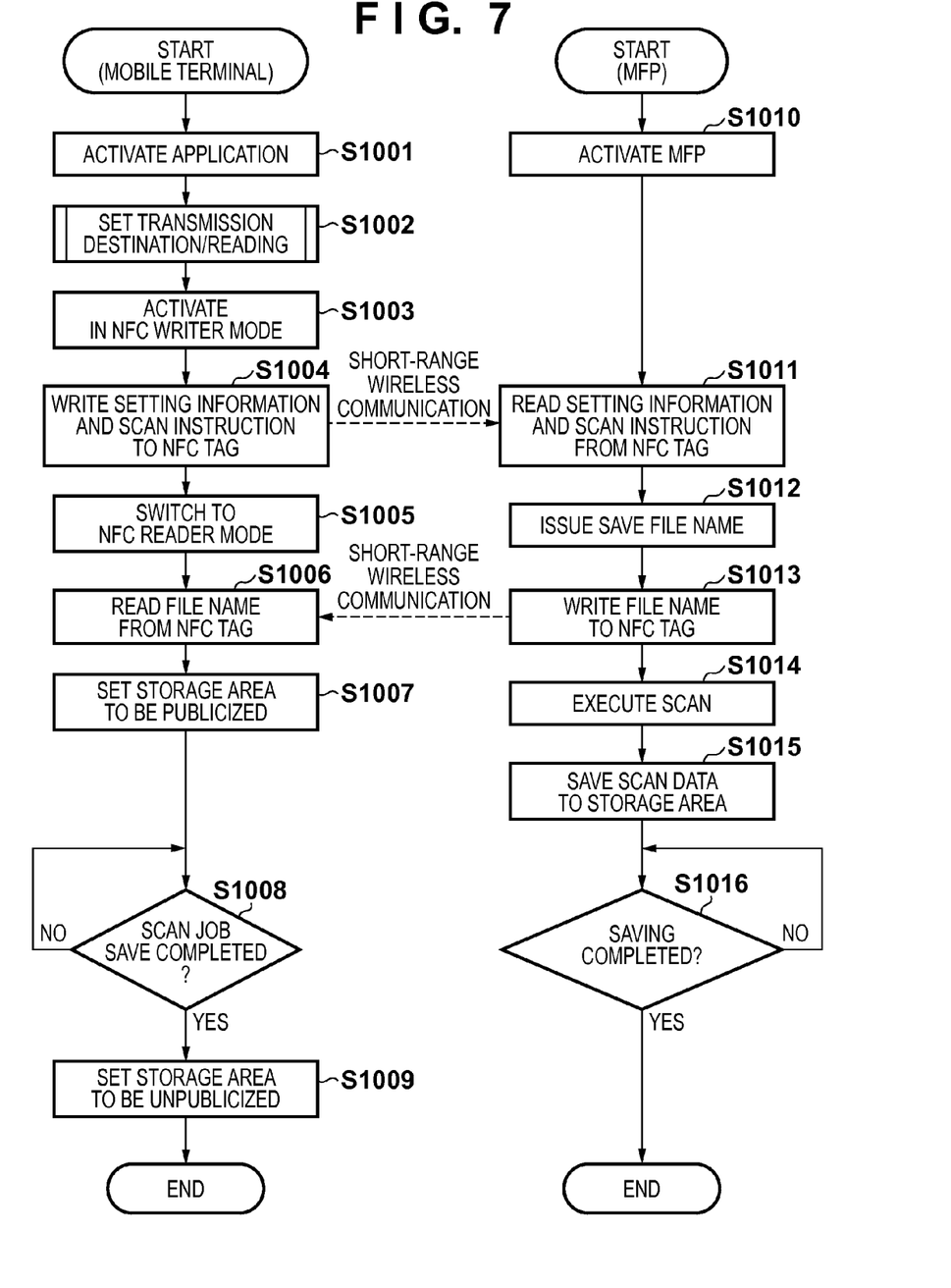
FIG. 7 is a view for showing the overall flow of the SEND operation according to a second embodiment.

Next, explanation will be given for a second embodiment according to the present invention using FIG. 7. The flowchart of FIG. 7 shows a SEND processing procedure realized by the MFP 101 and the mobile terminal 102 in a cooperative manner. The processing of step S1001 through step S1009, which is by the mobile terminal 102, in the flowchart, is based on a program stored on either the ROM 403, the storage apparatus 404, or the RAM 402 in FIG. 4, and is executed by the CPU 401. Also, the processing of step S1010 through step S1016, which is by the MFP 101, in the flowchart, is based on a program stored on either the ROM 303, the storage device 304, or the RAM 302 in FIG. 3, and is executed by the CPU 301.

Firstly as mentioned previously, when the main power is activated, based on the program stored on the ROM 303 on the controller board 300, the MFP 101 activates the CPU 301 in step S1010. On the other hand, the mobile terminal 102 activates the mobile SEND application in order to perform the mobile SEND in step S1001. After the activation, the mobile SEND application displays the previously described screen 600 on the display unit 406, and in accordance with a user input, the setting of the transmission format, the save format, the original scan (read), or the like, are performed in step S1002. When the user completes the setting of the transmission format, or the like, the processing leaves the subroutine in step S1002.

In the present embodiment, the transmission of the SEND setting information or the original scan start instruction is performed by writing by the NFC writer arranged on the mobile terminal 102 to the NFC tag arranged on the MFP 101. More specifically, the CPU 401 activates the NFC controller 413 of the mobile terminal 102 in writer mode in step S1003. After that, when the user causes the mobile terminal to approach the NFC tag 106 of the MFP 101, the CPU 401 writes the setting information and the scan start instruction to the NFC tag 106 of the MFP 101, and writes access information for accessing the storage apparatus 404 of the mobile terminal 102 in step S1004. Note that the above described access information is the IP address and port number of the mobile terminal 102 in the present embodiment.

When the setting information is received from the mobile terminal 102, the CPU 301, in step S1011, reads out the setting information, the scan instruction and access information written to the NFC tag. Then, the CPU 301, in response to the scan instruction, issues the SEND job related information (file name) in step S1012, and writes the file name to the NFC tag 106 in step S1013.

The reception of the file name in the present embodiment is performed by reading out, by the NFC reader arranged on the mobile terminal 102, information from the NFC tag 106 of the MFP 101. Therefore, the CPU 401 switches the NFC controller 413 of the mobile terminal 102 into the reader mode in step S1005. Then, the CPU 401 reads out the file name of the SEND job from the NFC tag 106 of the MFP 101 in step S1006. Note that the processing of step S1004 through step S1006 and step S1011 through step S1013 is executed if the user causes the mobile terminal 102 to approach the NFC tag 106 of the MFP 101 only one time.

Next, in step S1007, the CPU 401 opens a port whose port number is included in the access information transmitted to the MFP 101 in step S1004, and publicizes accessibly the storage area designated by the access information. With this, the MFP 101 enters a state in which it is able to access the storage apparatus 404 of the mobile terminal 102. On the other hand, due to the original scan instruction received in step S1011, the CPU 301 starts scanning the original in step S1014. Then, when the received original scan is completed, the CPU 301 accesses the publicized storage apparatus 404 of the mobile terminal 102 via the network 105 in step S1015, and saves the scan data on the storage apparatus 404. The CPU 301 determines whether or not the saving of the scan data is completed in step S1016. When the saving is completed, the process is terminated. On the other hand, the CPU 401, in step S1008, determines whether or not the saving to the storage apparatus 404 of the file of the file name received from the MFP 101 has completed. When the save has completed, the CPU 401 closes the port in step S1009, and the process is terminated.

As explained above, according to the present embodiment, unlike the above described first embodiment, the mobile terminal 102 is notified of the file name (job-related information) of the data stored on the storage area. Therefore, the mobile terminal 102 monitors the publicized storage area, and when the data of the file name is stored, the mobile terminal 102 makes the storage area to be unpublicized. In this way, in this embodiment, it is not necessary for the mobile terminal 102 to receive the job completion notification from the MFP 101, so the processing can be reduced compared to the above described first embodiment.

Third Embodiment

Figure 8:
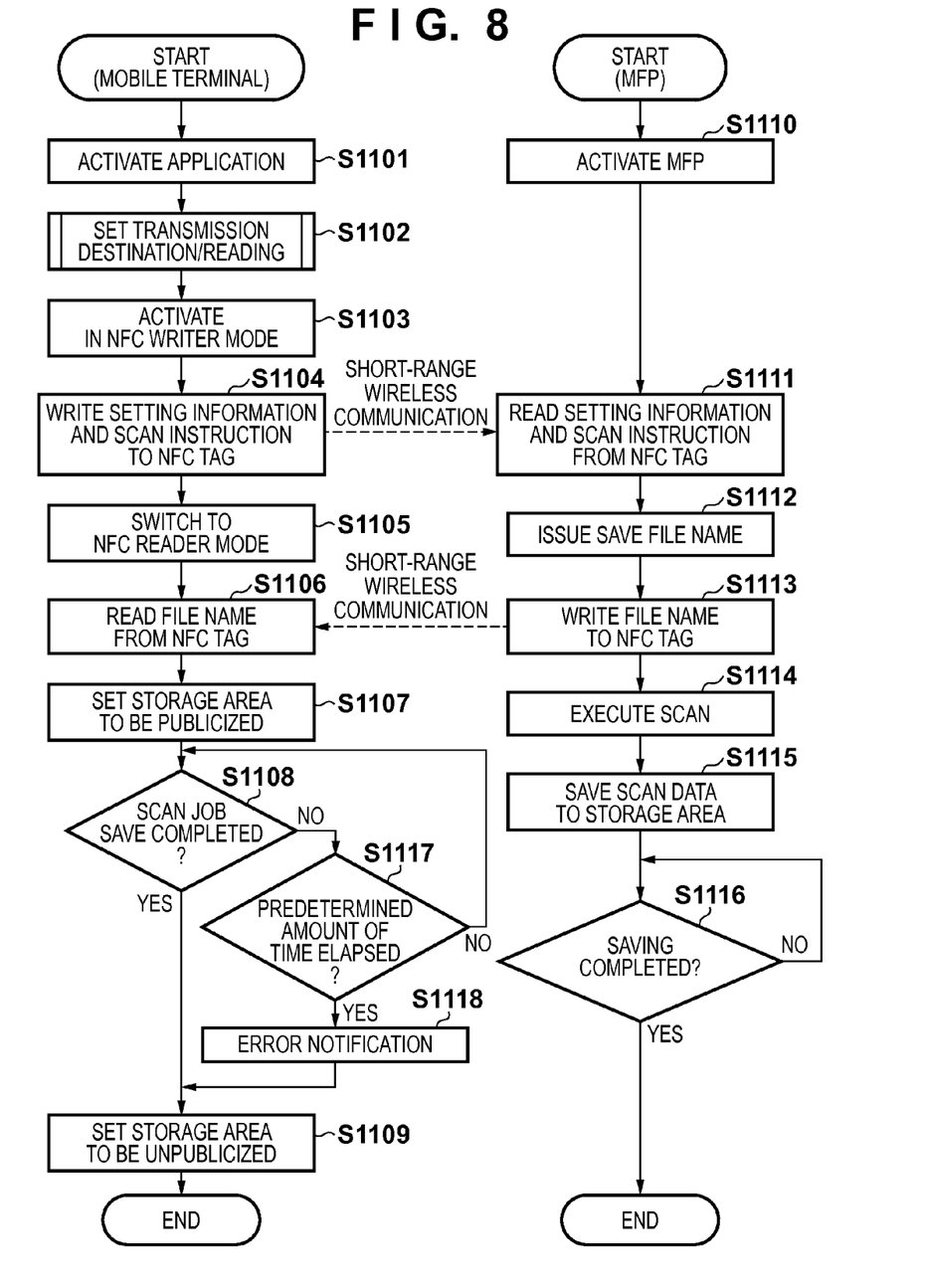
FIG. 8 is a view for showing the overall flow of the SEND operation according to a third embodiment.

Next, explanation will be given for a third embodiment according to the present invention using FIG. 8. The flowchart of FIG. 8 shows a SEND processing procedure realized by the MFP 101 and the mobile terminal 102 in a cooperative manner. Step S1101 through step S1109, and step S1117 and step S1118 in the flowchart, which is processing of the mobile terminal 102, is based on a program stored on either the ROM 403, the storage apparatus 404, or the RAM 402 in FIG. 4, and is executed by the CPU 401. Also, step S1110 through step S1116 in the flowchart, which is processing of the MFP 101, is based on a program stored on either the ROM 303, the storage device 304, or the RAM 302 in FIG.

3, and is executed by the CPU 301. Note, below, explanation will only be given for parts which differ from the processing in FIG. 7 explained in the above described second embodiment. That is, because step S1101 through step S1107 is the same as the processing of step S1001 through step S1007 and the processing of step S1110 through step S1116 is the same as the processing of step S1010 through step S1016, their explanation will be omitted.

Figure 9:
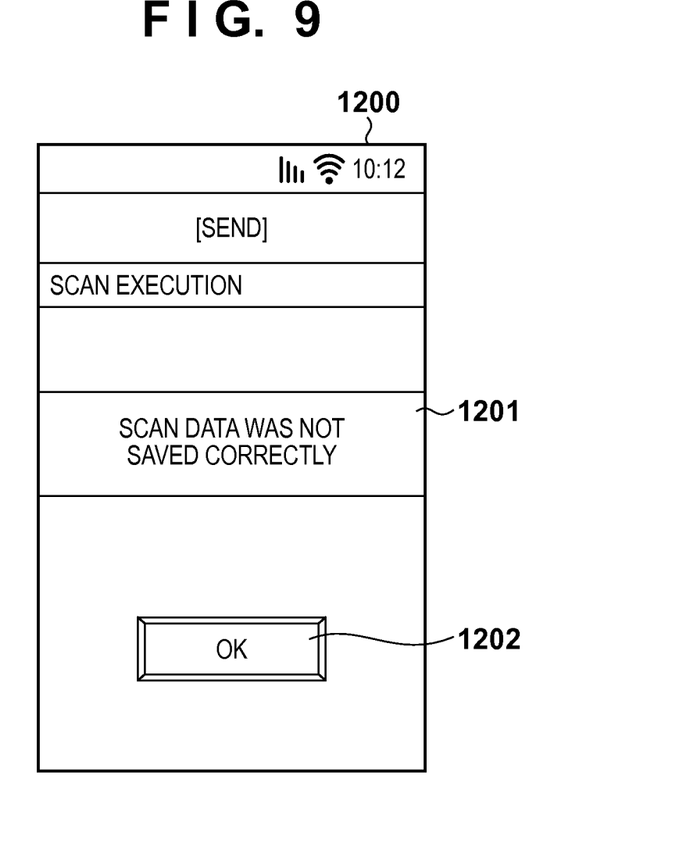
FIG. 9 is a view for showing a screen displaying that a SEND job of a SEND application terminated in error according to the third embodiment.

In step S1108, the CPU 401 of the mobile terminal 102 determines whether or not the saving to the storage apparatus 404 of the file of the file name received from the MFP 101 has completed. Here, in a case where the saving has completed, the processing proceeds to step S1109; if the saving has not completed the processing proceeds to step S1117. In step S1117, the CPU 401 determines whether or not a predetermined amount of time from when the storage area is publicized has elapsed. That is, it is determined whether or not an error in the file save processing occurs. Here, in a case where the predetermined amount of time has elapsed, the processing proceeds to step S1118, and the CPU 401 performs error notification towards the user or the MFP 101, and the processing proceeds to step S1109. Note, the CPU 401, functioning as a display control unit, displays a screen 1200 shown in FIG. 9 on the display unit 406 in step S1109. The screen 1200 is comprised of a display 1201 stating that the scan data is not saved correctly, and an OK button 1202. When the user confirms the display 1201, by pressing the OK button 1202, the user can cause transition from the screen 1200, for example, to the screen 500. On the other hand, in a case where the predetermined amount of time has not elapsed, the processing returns to step S1108. In step S1109, the CPU 401 closes the port, and the process is terminated.

As explained above, in addition to the configuration of the above described second embodiment, when a predetermined amount of time from when the storage area is publicized elapses, the mobile terminal 102 makes the storage area to be unpublicized even before the data of the corresponding file name is stored on the storage area according to the present embodiment. Furthermore, the mobile terminal 102 determines that an error occurs in the storage processing, and notifies the user of the error. With this, even in a case where an error occurs in the storage processing in the above described the second embodiment, the publicized storage area can be made to be unpublicized, and publicizing the storage area pointlessly can be prevented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-248341 filed Nov. 29, 2013, which is hereby incorporated by reference herein in its entirety.

What is claimed is:

1. A system in which a mobile terminal and an image processing apparatus are capable of communicating, the mobile terminal comprising:
   a wireless interface unit configured to transmit to the image processing apparatus, using a short-range wireless communication, a start instruction for causing the image processing apparatus to start a read of an image and access information for accessing the mobile terminal; and
   a processing unit configured to, when job-related information related to a job corresponding to the start instruction and identification information for identifying image data to be stored in a storage area of the mobile terminal by the access information are received from the image processing apparatus in response to the start instruction, publicize accessibly the storage area over the wireless interface unit, monitor whether or not the image data is stored in the publicized storage area using the identification information, and make the publicized storage area to be inaccessibly unpublicized after predetermined image data indicated by the identification information is stored in the publicized storage area,
   and the image processing apparatus comprising:
   a job-related information notification unit configured to receive the start instruction and the access information transmitted by the wireless interface unit, to issue the job-related information, and notify the mobile terminal of the job-related information and the identification information using the short-range wireless communication;
   a reading unit configured to read an image from an original in accordance with the start instruction; and
   a storage unit configured to store the predetermined image data including the identification information read from the original by the reading unit by accessing, using the access information for accessing the storage area publicized by the publicizing control unit.

2. The system according to claim 1, wherein
   the identification information is a file name of the predetermined data stored in the storage area, and
   the publicizing control unit makes the publicized storage area to be inaccessibly unpublicized when the predetermined data of the file name corresponding to the job is stored in the storage area.

3. The system according to claim 2, wherein the publicizing control unit makes the storage area to be inaccessibly unpublicized when a predetermined amount of time from when the storage area is publicized elapses, even if the data of the file name corresponding to the job is not yet stored in the storage area.

4. The system according to claim 3, wherein the mobile terminal further comprises a display control unit configured to display an error on a display unit when a predetermined amount of time elapses from when the storage area is publicized by the publicizing control unit.

5. The system according to claim 1, wherein the image processing apparatus further comprises an NFC tag, and
the wireless interface unit writes the start instruction and the access information to the NFC tag via the short-range wireless communication.

6. The system according to claim 5, wherein the job-related information notification unit writes the job-related information to the NFC tag, and
the mobile terminal reads the job-related information written to the NFC tag.

7. The system according to claim 1, wherein the storage unit accesses the mobile terminal via a wireless LAN.

8. A mobile terminal capable of communicating with an image processing apparatus, the mobile terminal comprising:
a wireless interface unit configured to transmit to the image processing apparatus a start instruction for causing the image processing apparatus to start a read of an image and access information for accessing the mobile terminal using a short-range wireless communication; and
a processing unit configured to, when job-related information related to a job corresponding to the start instruction and identification information for identifying image data to be stored in a storage area of the mobile terminal by the access information are received from the image processing apparatus in response to the start instruction, publicize accessibly the storage area over the wireless interface unit, monitor whether or not the image at is stored in the publicized storage area using the identification information, and make the publicized storage area to be inaccessibly unpublicized after predetermined image data indicated by the identification information is stored in the publicized storage area.

9. An image processing apparatus capable of communicating with a mobile terminal, the image processing apparatus comprising:
a job-related information notification unit configured to receive using a short-range wireless communication, a start instruction for causing the image processing apparatus to start a read of an image and access information for accessing the mobile terminal, which are transmitted from the mobile terminal to issue job-related information relating to a job corresponding to the start instruction, and using the short-range wireless communication to notify the mobile terminal of the job-related information and identification information for identifying image data to be stored in a storage area of the mobile terminal by the access information;
a reading unit configured to read an image from an original in accordance with the start instruction; and
a storage unit configured to store predetermined image data including the identification information read from the original by the reading unit by accessing, using the access information for accessing the storage area publicized by the notification of the job-related information by the job-related information notification unit, wherein
the publicized storage area is inaccessibly unpublicized by the mobile terminal after the predetermined image data indicated by the identification information is stored in the publicized storage area.

10. A method of controlling a system in which a mobile terminal and an image processing apparatus are capable of communicating, comprising the steps of:
the mobile terminal using a short-range wireless communication to transmit to the image processing apparatus a start instruction for causing the image processing apparatus to start a read of an image and access information for accessing the mobile terminal;
publicize accessibly a storage area of the mobile terminal designated by the access information over the short range wireless communication when job-related information related to a job corresponding to the start instruction and identification information for identifying image data to be stored in the storage area of the mobile terminal by the access information is received from the image processing apparatus in response to the start instruction;
monitoring whether or not the image data is stored in the publicized storage area using the identification information; and
make the publicized storage area to be inaccessibly unpublicized after predetermined image data indicated by the identification information is stored in the publicized storage area, wherein
the image processing apparatus receives the start instruction and the access information transmitted in the transmitting by the mobile terminal, issues the job-related information, and notifies using the short-range wireless communication the mobile terminal of the job-related information and the identification information,
reads an image from an original in accordance with the start instruction, and
stores the predetermined image data including the identification information read from the original in the reading by the image processing apparatus by accessing, using the access information for accessing the storage area publicized in the publicizing by the mobile terminal.

11. A method of controlling a mobile terminal capable of communicating with an image processing apparatus, the method comprising:
using a short-range wireless communication to transmit to the image processing apparatus a start instruction causing the image processing apparatus to start a read of an image and access information for accessing the mobile terminal; and
when job-related information related to a job corresponding to the start instruction and identification information for identifying image data to be stored in a storage area of the mobile terminal by the access information are received from the image processing apparatus in response to the start instruction, publicizing accessibly the storage area over the short-range wireless communication, monitoring whether or not the range data is stored in the publicized storage area using the identification information, and making the publicized storage area to be inaccessibly unpublicized after predetermined image data indicated by the identification information is stored in the publicized storage area.

12. A method of controlling an image processing apparatus capable of communicating with a mobile terminal, the method comprising:

using a short-range wireless communication to receive a start instruction causing the image processing apparatus to start a read of an image, and access information for accessing the mobile terminal which are transmitted from the mobile terminal, issuing job-related information relating to a job corresponding to the start instruction, and notifying using the short-range wireless communication the mobile terminal of the job-related information and identification information for identifying image data to be stored in a storage area of the mobile terminal by the access information;

reading an image from an original in accordance with the start instruction; and storing predetermined image data including the identification information read from the original in the reading by using the access information to access a storage area publicized by the notification of the job-related information, wherein the publicized storage area is inaccessibly unpublicized by the mobile terminal after the predetermined image data indicated by the identification information is stored in the publicized storage area.

13. A non-transitory computer-readable storage medium storing a computer program for causing a computer to execute a method of controlling a mobile terminal, the method for controlling comprising:

using a short-range wireless communication to transmit to the image processing apparatus a start instruction causing the image processing apparatus to start a read of an image and access information for accessing the mobile terminal; and when job-related information related to a job corresponding to the start instruction and identification information for identifying image data to be stored in a storage area of the mobile terminal by the access information are received from the image processing apparatus in response to the start instruction, publicizing accessibly the storage area over the short-range wireless communication, monitoring whether or not the image data is stored in the publicized storage area using the identification information, and making the publicized storage area to be inaccessibly unpublished after predetermined image data indicated by the identification information is stored in the publicized storage area.

14. A non-transitory computer-readable storage medium storing a computer program for causing a computer to execute a method of controlling an image processing apparatus, the method for controlling comprising:

using a short-range wireless communication to receive a start instruction causing the image processing apparatus to start a read of an image, and access information for accessing the mobile terminal which are transmitted from the mobile terminal, issuing job-related information relating to a job corresponding to the start instruction, and notifying using the short-range wireless communication the mobile terminal of the job-related information and identification information for identifying image data to be stored in a storage area of the mobile terminal by the access information;

reading an image from an original in accordance with the start instruction; and storing predetermined image data including the identification information read from the original in the reading by accessing, using the access information for accessing a storage area publicized by the notification of the job-related information, wherein the publicized storage area is inaccessibly unpublicized by the mobile terminal after the predetermined image data indicated by the identification information is stored in the publicized storage area.

* * * * *